Figure 1:
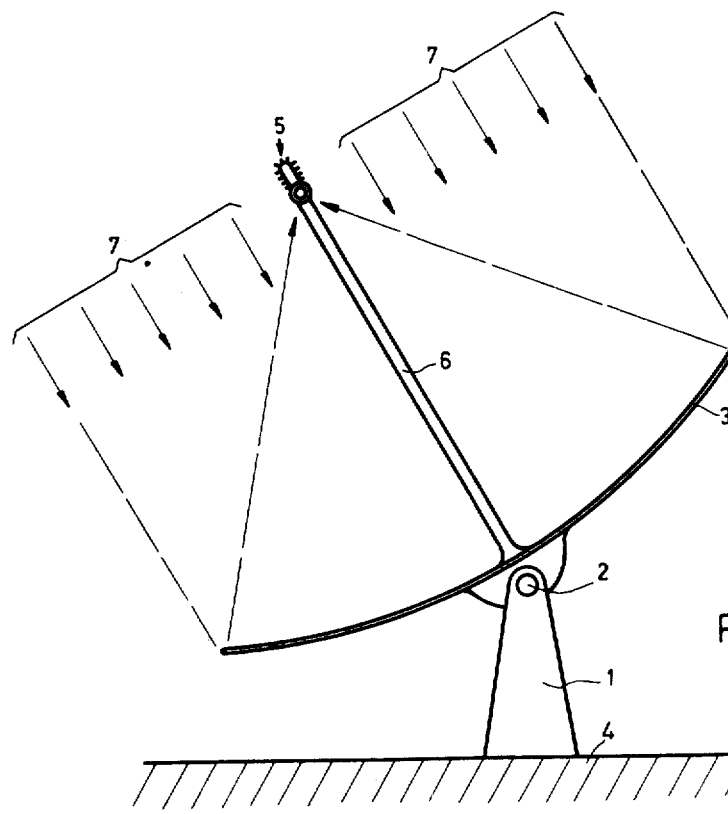

United States Patent [19]

Posnansky

[11] 4,089,174
[45] May 16, 1978

[54] METHOD AND APPARATUS FOR CONVERTING RADIANT SOLAR ENERGY INTO MECHANICAL ENERGY

[76] Inventor: Mario Posnansky, Pappelweg 4, 3072 Ostermundigen, (Canton of Berne), Switzerland

[21] Appl. No.: 556,590

[22] Filed: Mar. 10, 1975

[30] Foreign Application Priority Data

Mar. 18, 1974 Switzerland .................. 3711/74

[51] Int. Cl.² ............................................. F03G 7/02
[52] U.S. Cl. .......................................... 60/641; 60/682; 60/516; 60/508; 60/512; 418/83
[58] Field of Search ................... 60/641, 508–515, 60/516, 650, 651, 670, 671, 682; 126/270, 271; 418/83

[56] References Cited

U.S. PATENT DOCUMENTS

| 1,248,456 | 12/1917 | Clark | 126/270 UX |
|---|---|---|---|
| 1,989,999 | 2/1935 | Niederle | 60/641 |
| 2,789,415 | 4/1957 | Motsinger | 60/508 X |
| 2,920,710 | 1/1960 | Howard | 126/270 X |
| 3,029,596 | 4/1962 | Hanold et al. | 126/270 X |
| 3,064,418 | 11/1962 | Sanders | 126/270 X |
| 3,105,486 | 10/1963 | Glenn | 126/270 |
| 3,117,414 | 1/1964 | Daniel et al. | 126/270 X |
| 3,169,375 | 2/1965 | Velthuis | 60/670 |
| 3,364,676 | 1/1968 | Miller | 60/641 |
| 3,495,402 | 2/1970 | Yates | 60/641 |
| 3,892,433 | 7/1975 | Blake | 126/270 X |
| 3,905,195 | 9/1975 | Gregory | 60/512 |

*Primary Examiner*—Allen M. Ostrager

[57] ABSTRACT

In a heat engine having an expansion chamber, sunrays focused by means of a reflector are conveyed, for converting solar energy into mechanical energy, through a window permeable to sunrays into the expansion chamber of the heat engine, there to be absorbed by a heat-transfer medium contained in the expansion chamber, whereby the medium expands or evaporates and drives the engine.

8 Claims, 5 Drawing Figures

METHOD AND APPARATUS FOR CONVERTING RADIANT SOLAR ENERGY INTO MECHANICAL ENERGY

This invention relates to a method of converting solar energy into mechanical energy by concentrating radiant solar energy in an operative zone by means of a reflector, and to an apparatus for carrying out this method, comprising a reflector for concentrating radiant solar energy in an operative zone and a heat engine having a closed cycle for a heat-transfer medium.

Various methods and apparatus have already been proposed for utilizing solar energy. Only temperatures up to certain limits, or even relatively low temperatures, can be attained with the known manner of supplying heat to the heat-transfer medium, which means that the solar energy is not being utilized very efficiently. This manifests itself in a low Carnot factor of the particular heat-engine generating station. For example, the solar energy is collected by means of collectors in which black-painted pipes are disposed. These pipes lead into a central collecting pipe, through which water heated up to 70° C. is supplied to a thermal power process. As a result of the small difference in temperature between the cold medium and the heated medium, the efficiency is very low. In most cases, although it is theoretically something under 10%, it is actually only about 2% in practice.

The sun represents a very great energy potential which, unlike fossil fuels, is available unrestrictedly and free of charge. Although solar radiation produces a relatively low maximum energy density of 1 kw/sq.m. on the earth's surface, it is a very high-yield form of energy from a thermodynamic point of view, for it issues from a heat source of over 6000° C. The greatest proportion of energy occurs in the form of electromagnetic radiation in the shorter-wave infrared frequency spectrum.

It is the object of this invention to provide a method of converting radiant solar energy into mechanical energy, and an apparatus for carrying out that method, wherein the heat-transfer medium is brought to a higher temperature so that the conversion process may be carried out with substantially greater efficiency than has hitherto been possible with the known methods and apparatus.

To this end, in the method according to the present invention, a heat-transfer medium contained in a closed cycle of a heat engine is conveyed through the operative zone, where it is directly insolated by the radiant solar energy, which is thereupon absorbed by the heat-transfer medium.

The apparatus for carrying out the foregoing method further comprises a heating chamber for heating the heat-transfer medium, this chamber forming part of the closed cycle, being disposed in the operative zone, and being enclosed by at least one wall, and at least a portion of such a wall is made of a material transparent to radiant solar energy.

Figure 2:
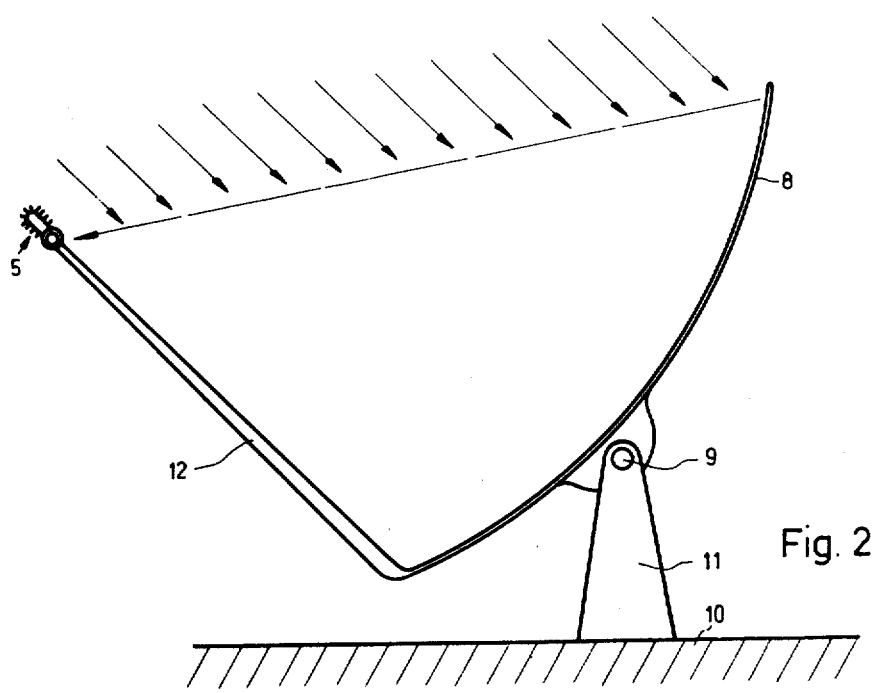
Figure 3:
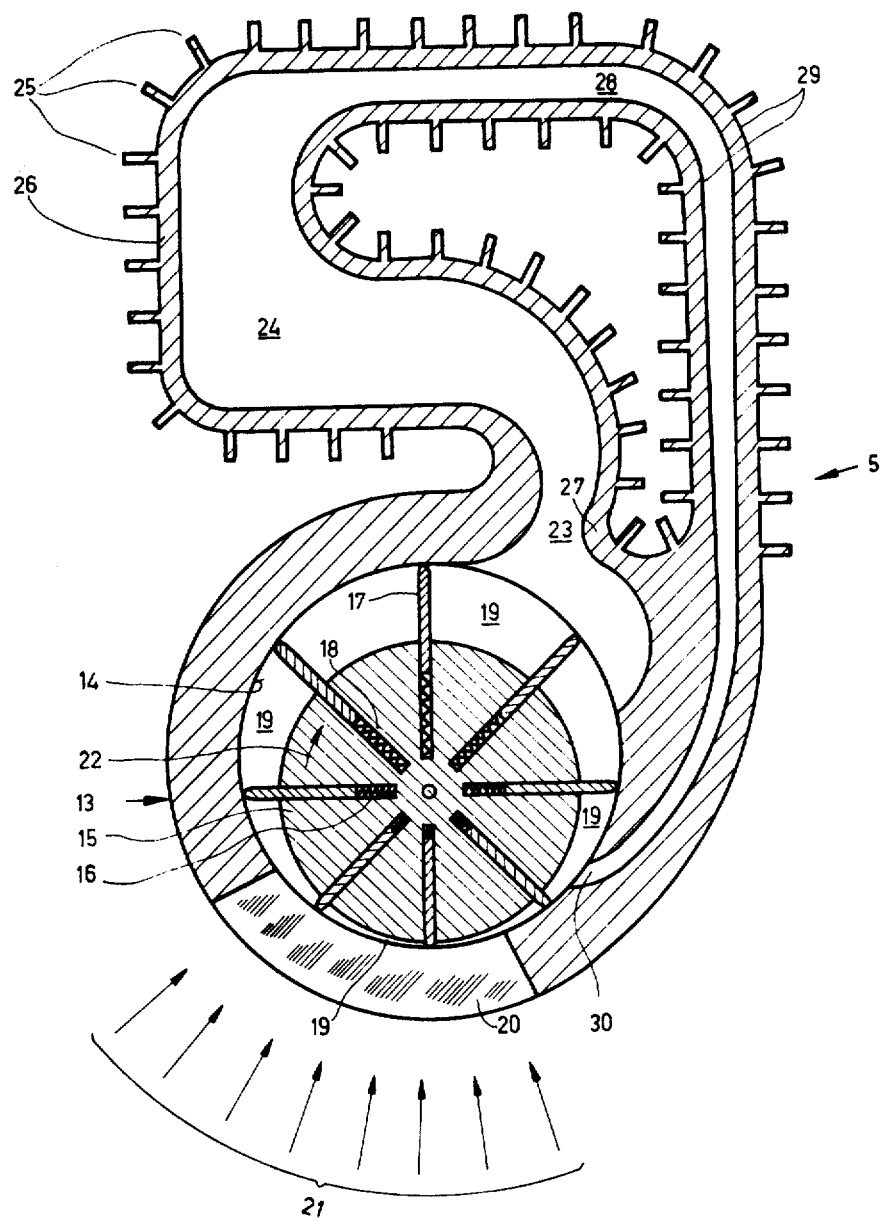
Figure 4:
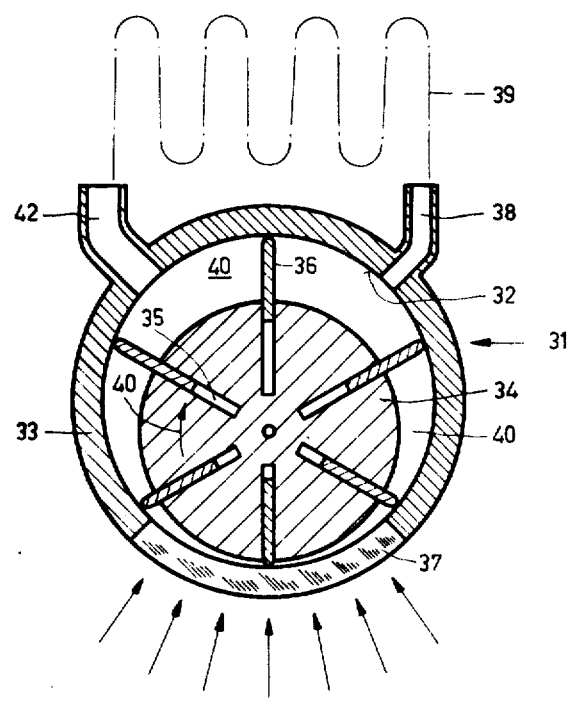
Figure 5:
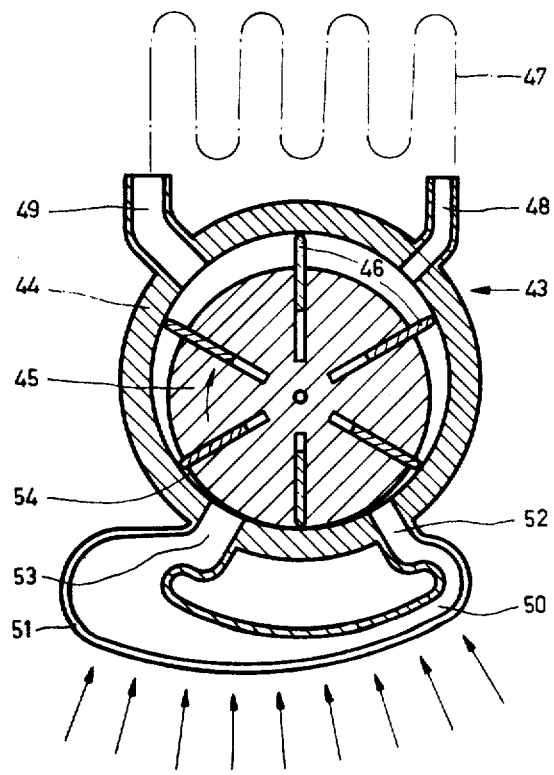

Several possible embodiments of the invention will now be described in detail with reference to the accompanying drawings, in which:

FIG. 1 is a side elevation of an apparatus, shown diagrammatically, for converting solar energy into mechanical energy, having a parabolic reflector adapted to follow up the position of the sun, FIG. 2 is a side elevation of another embodiment of the apparatus having a halved parabolic reflector, FIG. 3 is a cross-section through a heat engine as used in the apparatus shown in FIGS. 1 and 2, FIG. 4 is a cross-section through part of a second design of the heat engine, and FIG. 5 is a cross-section through part of a third design of the heat engine.

The invention described below aims at keeping the solar energy in its high-yield form to the greatest extent possible, i.e., at introducing it at the highest possible temperature into a thermodynamic cycle for producing mechanical energy.

The apparatus illustrated in FIG. 1 comprises a parabolic cylindrical reflector 3 pivoted about a shaft 2 on a support 1 firmly secured in the ground 4. The reflector 3 can be caused to follow up the position of the sun by drive means (not shown). A heat engine 5, which will be described in greater detail below with reference to FIG. 3, is disposed along the focal line of the reflector 3. The heat engine 5 is rigidly connected to the side edges of the reflector 3 by two carrier arms 6, only one of which is visible in FIG. 1. The sunrays 7 striking the reflector 3 parallel to one another are concentrated by the reflector 3 on an operative zone, where the energy is directly transmitted to a heat-transfer medium.

FIG. 2 shows another embodiment of such an apparatus, comprising a halved parabolic cylindrical reflector 8 which is pivoted mounted about a shaft 9 on a support 11 secured to the ground 10. The heat engine 5, which may be the same as that in FIG. 1, is rigidly connected to the lower corner areas of the reflector 8 by two carrier arms 12 and is disposed along the focal line of the reflector 8 in such a way that the incident parallel sunrays are concentrated in the area of the heat engine. The advantage of using the halved parabolic cylindrical reflector 8 is that the heat engine 5 is then situated outside the region through which the sunrays pass to strike the reflector 8, so that neither the heat engine 5 nor any auxiliary devices impair the incidence of the sunrays on the reflector 8. Furthermore, a more favorable distribution of energy density in the operative zone may be achieved thereby.

FIG. 3 shows a cross-section through the heat engine 5. It may, for example, have a tubular housing 13 with a cylindrical bore 14 in which a rotor 15 is eccentrically mounted for rotation. The rotor 15 has a number of grooves 16 extending radially throughout its length. Positioned in each groove 16 is a radially movable slide 17. Between the bottoms of the grooves 16 and the slides 17 inserted therein are relatively weak spring members 18 which press the slides 17 outward so that when the rotor 15 is at a standstill, the slides 17 rest against the wall of the bore 14. When the rotor 15 is in motion, the slides 17 are also pushed outward by centrifugal force to achieve the necessary sealing effect between the slides 17 and the wall of the bore 14. A number of chambers 19 are each defined by two adjoining slides 17, a portion of the wall of the bore 14, and a portion of the surface of the rotor 15. The volume of the chambers 19 is dependent upon the angle of rotation of the rotor 15.

The housing 13 comprises at the bottom, as viewed in FIG. 3, a portion 20 made of a material which is permeable to electro-magnetic radiation in the wave range of from 0.2 to at least 3.0 microns. The chambers 19 which is lowermost, as viewed in FIG. 3, contains a liquid heat-transfer medium which is directly insolated through the transparent portion 20 of the housing 13 by part of the concentrated sunrays 21, which are thereupon for the most part absorbed by the heat-transfer medium.

By means of the very intensive effect of the radiation, the heat-transfer medium in the lowermost chamber is very quickly heated and evaporated, the vapor preferably even being super-heated. The pressure thereby produced in the lowermost chamber 19 drives the rotor 15 clockwise as indicated by an arrow 22. When the rotor 15 hs rotated approximately 180°, the chamber 19 which was originally lowermost has reached its uppermost position, and the expanded vaporous medium escapes through a channel 23 into a cooling chamber 24 surrounded by a wall 26 provided with cooling fins 25. A protrusion 27 extends into the channel 23 so that most of the vaporous medium flowing out of the uppermost chamber 19 reaches the coolig chamber 24 via the channel 23. Due to its further expansion and to the cooling effect on the wall 26 provided with the cooling fins 25, the vaporous medium flowing out of the uppermost chamber 19 cools down and condenses on walls 29 forming the inside of an outlet channel 28. The condensed medium flows down along the narrowing outlet channel 28 and is returned via a supply channel 30 to the chamber 19 immediately preceding the lowermost chamber. The operation described above then begins anew.

It will be noted that this mode of operation bears a certain similarity to that of a rotary piston engine. The decisive difference is that the energy in the operative space, i.e., in the chamber 19 gradually expanding in the direction of rotation of the rotor 15, is not produced by the combustion of a fuel but is transmitted to the heat-transfer medium by direct insolation of thermal energy. The temperature to which the medium is heated by concentrated insolation may be so chosen as to be approximately as high as that of the gases in a combustion engine. Thus a high Carnot factor, or rate of energy utilization, may be attained.

As a result of the direct insolation of the heat-transfer medium through the transparent portion 20 of the housing 13 by sharply focused solar energy, with absorption of the energy by the heat-transfer medium, substantially lower heat-transfer losses occur than is the case with conventional methods in which the radiation is first directed to a black body containing a medium that is heated indirectly via conduction and convection. The present method also makes it possible to achieve a very high energy density for the transfer to the medium. When energy is radiated directly into the medium, the temperature of the latter is higher than that of the parts surrounding it, whereby the thermal radiation of those parts is also less, which likewise contributes to increased efficiency.

The cooling effect in the cooling chamber 24 may be increased by blowing a stream of cold air against the cooling fins 25 or by providing a water-cooling system (not shown). The cooling-water heated in this way may be further utilized for heating rooms or for operating heat pumps.

FIG. 4 shows a cross-section through a heat engine 31 in a further embodiment which is suitable for operation with a gaseous heat-tranfer medium. A rotor 34 is eccentrically mounted for rotation in a bore 32 of a tubular housing 33. The rotor 34 has six radially-directed longitudinal grooves 35, in each of which a slide 36 is movably positioned. Relatively weak spring means (not shown) ensure that all slides 36 rest against the inside of the housing 33 even when the rotor 34 is at a standstill. A lower portion 37 of the housing 33 illustrated in FIG. 4 is made of a material permeable to electromagnetic rays in the wave-length range of from 0.2 to at least 3.0 microns.

From a cooling device indicated only by a dot-dash line 39, cool gas or a gas mixture is conveyed through an inlet channel 38 into a chamber 40 situated in the vicinity of the inlet channel 36. Upon rotation of the rotor 34 in the direction indicated by an arrow 41, the gas or gas mixture is compressed and conveyed into the operative zone on the inside of the transparent portion 37 of the housing 33.

When the compressed gaseous medium enclosed within the chamber 40 reaches the operative zone, it is quickly heated by the very highly concentrated radiation; and through the increase in pressure within the chamber 40 caused thereby, the rotor 34 is driven, so that the heated medium leaves the operative zone, expands for the most part, finally leaves the housing 33 through an outlet channel 42, and is returned to the cooling device indicated by the line 39. This cooling device may be a simple heat exchanger in which the medium is expanded to such an extent that an adequate exchange of gas takes place. Suitable heat-transfer media are gases, gas mixtures, suspensions, aerosols, or mists. The suspension or mist may contain particles having lubricating properties. According to the medium used, the operating conditions will preferably be such that at least in the operative zone, the medium is in its hypercritical state.

FIG. 5 shows a cross-section through a heat engine 43 in still another embodiment. Eccentrically mounted in a tubular housing 44 is a rotor 45 having radially movable slides 46. The housing 44 comprises an inlet channel 48, connected to a cooling device indicated only by a dot-dash line 47, for supplying a heat-transfer medium, and an outlet channel 49 which is likewise connected to the aforementioned cooling device. Unlike the embodiments illustrated in FIGS. 3 and 4, the slide 46 which happens to be in the lowermost position at any given time is pushed virtually completely into its groove in the rotor 45 because the rotor 45 is off-centered to such an extent that it almost touches the inside of the housing 44 at the bottom.

Disposed below the housing 44 is a heating chamber 50 of which at least the lower wall 51, exposed to the concentrated radiation, is made of a material permeable to electromagnetic radiaton. The relatively cool heat-transfer medium entering the housing 44 through the inlet channel 48 is compressed and forced into the heating chamber 50 through a supply channel 52. The medium in the heating chamber 50 absorbs the concentratedly insolated energy, is thereupon very quickly heated, and is conveyed through an exhaust channel 53 into a chamber 54 situated in the lowest part of the housing 44. The excess pressure produced in the chamber 54 and the respective arrangement of the channels 52 and 53 serve to drive the rotor 45 and thus to return the heated and subsequently partially expanded medium via the outlet channel 49 to the cooling device indicated by the line 47.

A shaft (not shown) rigidly connected to the rotor 15, 34, or 45 passes through one of the end faces of the housing of the heat engine 5, 31, or 43 described above. Any kind of machine can be driven by means of a wheel or gears mounted on that shaft. Preferably, the shaft is connected to an electric generator for generating electrical energy.

It would also be possible to make the entire tubular housing 33 of the heat engine 31 according to FIG. 4 of a material permeable to electromagnetic rays, e.g., quartz glass. In that case, however, those parts of the housing which are not exposed to radiation should preferably be covered with a non-radiation-permeable coating, or else be made of a different material.

It is not absolutely necessary for the heat engine to extend over the entire length of the parabolic cylindrical reflector 3 or 8; instead, a number of such heat engines may be disposed in a row along the focal line of the reflector.

Instead of the heat engine shown in FIG. 4, a rotary piston engine may be used. A heat engine operating in the manner of a hot-air turbine may likewise enter into consideration.

Depending upon the particular embodiment, a circular parabolic reflector will be preferred to the parabolic cylindrical reflector for concentrating the radiation. For example, only a circular parabolic reflector will be used for a closed cycle with a two-stroke compression piston engine.

Owing to the direct transmission of solar energy to the heat-transfer medium, which forms the basis for the invention described above, operation at the highest temperatures, limited only by the materials used, becomes possible in that the solar radiation is sharply focused and supplied through the radiation-permeable wall directly to the medium for absorption thereby, this heating process taking place in the heating chamber of a heat engine.

What is claimed is:

1. Apparatus for converting solar energy into mechanical energy comprising:
   a. a reflector means for concentrating radiant solar energy in a predefined area;
   b. a device for directly converting said solar energy into mechanical energy by means of a closed cycle expansion of a fluid heated by direct radiation from solar energy, said device including,
   c. a housing having a portion of its area transparent to solar energy, said portion located in said predefined solar energy concentration area;
   d. a series of axially mounted rotatable reciprocally movable side walls forming a plurality of chambers with said housing; two of said walls forming an energy active chamber with said transparent housing area;
   e. inlet means for continuous introduction of the fluid in said chamber including said transparent area; and
   f. exhaust means for removal of that portion of the fluid which has been expanded in said chamber having said transparent area with said exhaust means interconnected with said inlet means to provide a closed system; said system allowing for continuous output of mechanical energy without provision of an energy storage means as long as solar energy is provided to activate the system.

2. The apparatus of claim 1 in which the vanes are eccentrically mounted so that the energy active chamber has the smallest volume of any of the chambers.

3. The apparatus of claim 1 in which a rotor is included and into which the side walls are inserted and radially outwardly biased.

4. An apparatus according to claim 1, further comprising a cooling device disposed on a side of said heat engine remote from said operative zone.

5. An apparatus according to claim 1, wherein said heat-transfer medium is a gas mixture capable of absorbing radiation.

6. An apparatus according to claim 1, wherein said heat-transfer medium is a suspension or an aerosol containing particles having lubricating properties.

7. In a method for converting solar energy into mechanical energy, including means for collecting and concentrating solar radiation and for converting solar energy into mechanical energy by movement of a heated fluid, the improvement comprising: producing continuous heating and expansion cycles without storing any of said energy as long as radiant energy is present by directly exposing a fluid to solar energy in one of a series of chambers formed by a plurality of axially rotatably mounted side walls and a housing surrounding said side walls, said one of said chambers including a transparent wall formed in said housing expanding said fluid by said solar radiation through said chamber; forming an energy operative zone; rotating said side walls due to expansion pressure and continuously repeating the fluid expansion as other pairs of side walls carrying the fluid are aligned with the transparent chamber portion.

8. A method according to claim 7, wherein said medium is supplied to said zone in a liquid state and is evaporated in said zone.

* * * * *